US011643951B1

(12) United States Patent
Quinones

(10) Patent No.: US 11,643,951 B1
(45) Date of Patent: May 9, 2023

(54) EXPANDABLE ENGINE FLUID CATCHER

(71) Applicant: Victor Quinones, Yuma, AZ (US)

(72) Inventor: Victor Quinones, Yuma, AZ (US)

( * ) Notice: Subject to any disclaimer, the term of this patent is extended or adjusted under 35 U.S.C. 154(b) by 0 days.

(21) Appl. No.: 17/391,706

(22) Filed: Aug. 2, 2021

Related U.S. Application Data

(60) Provisional application No. 63/059,859, filed on Jul. 31, 2020.

(51) Int. Cl.
*F01M 1/10* (2006.01)
*F01M 11/03* (2006.01)

(52) U.S. Cl.
CPC .............. *F01M 1/10* (2013.01); *F01M 11/03* (2013.01); *F01M 2001/1064* (2013.01)

(58) Field of Classification Search
CPC ... F01M 1/10; F01M 11/03; F01M 2001/1064
USPC ......................................................... 210/248
See application file for complete search history.

(56) References Cited

U.S. PATENT DOCUMENTS

| | | | |
|---|---|---|---|
| 3,703,956 A | 11/1972 | Oswalt | |
| 4,020,922 A | 5/1977 | Klasel | |
| 4,221,670 A * | 9/1980 | Ziemek | A47J 31/0626 210/474 |
| 4,376,703 A | 3/1983 | Krauss | |
| 4,877,155 A | 10/1989 | Tull | |
| 5,366,084 A * | 11/1994 | Post | B01D 35/31 206/319 |
| 5,469,935 A | 11/1995 | Hewuse | |
| 5,623,755 A | 4/1997 | Chidress et al. | |
| 6,009,971 A * | 1/2000 | Weidman | A61B 7/02 181/131 |
| 6,217,762 B1 | 4/2001 | Rooney et al. | |
| 6,227,078 B1 | 5/2001 | Lemmo, Jr. | |
| 6,769,516 B2 | 8/2004 | Carson | |
| 7,147,013 B2 * | 12/2006 | Zulauf | B01D 35/31 141/97 |
| 7,662,285 B2 | 2/2010 | Bilski | |
| 2004/0226878 A1 | 11/2004 | Higgins | |
| 2019/0061517 A1 * | 2/2019 | Hagano | B60K 15/0406 |

* cited by examiner

*Primary Examiner* — Yi-Kai Wang
(74) *Attorney, Agent, or Firm* — Invention To Patent Services; Alex Hobson

(57) ABSTRACT

An expandable engine fluid catcher that is configured to attach to an engine fluid filter, such as an oil filter, and catch engine fluid as the fluid filter is removed from the engine. An engine may be part of a vehicle and the engine fluid filter may be an oil filter. An expandable engine fluid catcher has a retainer portion having a retainer band that is secured around the engine fluid filter. Most engine fluid filters are cylindrical in shape and therefore a band, and in particular an elastic band, may be used to attach the expandable engine fluid catcher to the fluid filter. A pleated portion of the expandable engine fluid catcher has a plurality of pleats that extend from the retainer band upward to an expandable end that can be flared out, or expanded, to provide a larger diameter for catching engine fluid therein.

12 Claims, 5 Drawing Sheets

EXPANDABLE ENGINE FLUID CATCHER

CROSS REFERENCE TO RELATED APPLICATIONS

This application claims the benefit of priority to U.S. provisional patent No. 63/059,859, filed on Jul. 31, 2020; the entirety of which is hereby incorporated by reference herein.

BACKGROUND OF THE INVENTION

Field of the Invention

The invention relates an expandable engine fluid catcher having a retainer portion configured to couple with a fluid filter and a pleated portion that is expandable to catch engine fluid as the filter is removed from the engine.

Background

Changing fluid filters, such as an oil filter of a vehicle is a messy job. Oil drips and runs down the filter as it is removed and gets on the floor and soils your hands and in some case your arm. Then the filter has to carefully be moved in an upright and vertical orientation to prevent fluid from spilling and leaking out from the top of the filter.

SUMMARY OF THE INVENTION

The invention is directed to an expandable engine fluid catcher that is configured to attach to an engine fluid filter, such as an oil filter, and catch engine fluid as the filter is removed from the engine. An engine may be part of a vehicle and the engine fluid filter may be an oil filter. An exemplary expandable engine fluid catcher has a retainer portion having a retainer band that is secured around the engine fluid filter. Most engine fluid filters are cylindrical in shape and therefore a band, and in particular an elastic band, may be used to attach the expandable engine fluid catcher to the fluid filter. A pleated portion of the expandable engine fluid catcher extends toward the engine end of the fluid filter from the retainer band and has an expandable end that can be flared out, or expanded, to provide a larger diameter for catching engine fluid therein.

An exemplary retainer band may be an elastic band, such as a urethane, rubber, or silicone band. An elastic band is a band that can be enlarged or stretched opened to fit around the engine fluid filter and then retracts back to secure the expandable engine fluid catcher to the fluid filter. An elastic material is herein defined as a material that can be deformed by a deforming force and then returns to an original shape upon removal of the deforming force. A filter aperture of the expandable engine fluid catcher may be formed by the elastic band to allow the band to fit around the outside surface of the fluid filter.

An exemplary pleated portion is coupled to the retainer band and has a plurality of pleats extending upward from the retainer end, coupled to the retainer portion, to the expandable end. The pleats have an inner pleat fold and outer pleat fold that enables the expandable end to be expanded or flared outward to provide a larger area to catch engine fluid. An exemplary pleated portion may comprise an absorption layer along an inside surface to absorb engine fluid therein. An absorption layer may be foam, cloth, paper or a non-woven or woven fabric, for example. An exemplary pleated portion may have a barrier layer to prevent the engine fluid from passing through the pleated portion, and a barrier layer may be a polymer or wax film or coating. An exemplary barrier layer forms a film layer that is non-permeable and solid to prevent the passage of engine fluid therethrough. An exemplary expandable engine fluid catcher may be disposable and may be provided in stacks of individual expandable engine fluid catchers to form packs.

A method of catching engine fluid includes: providing an expandable engine fluid catcher as described herein; attaching the expandable engine fluid catcher to an engine fluid filter that is engaged with an engine; expanding the expandable end of the pleated portion to increase the catch diameter of the pleated portion, removing the engine fluid filter from the engine; catching the engine fluid inside of the pleated portion of the expandable engine fluid catcher, or between the pleated portion and the engine fluid filter.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
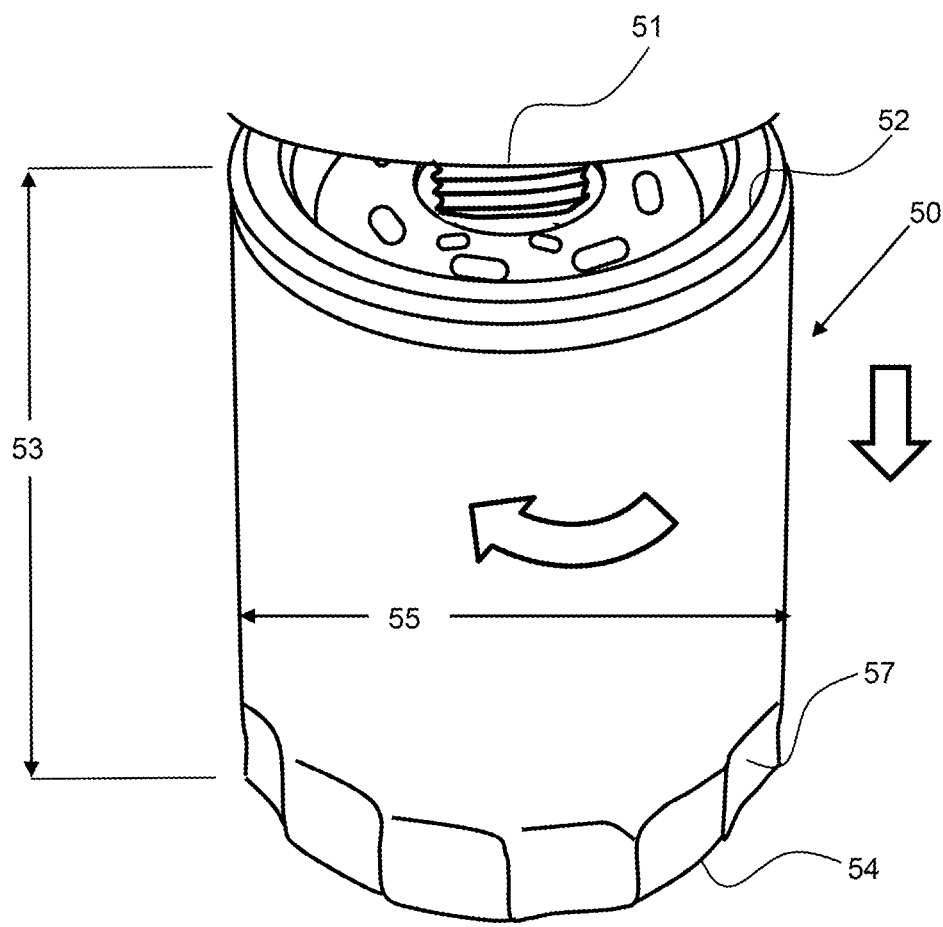
FIG. 1 shows a perspective view of an engine fluid filter being turned to detach it from the vehicle.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 2:
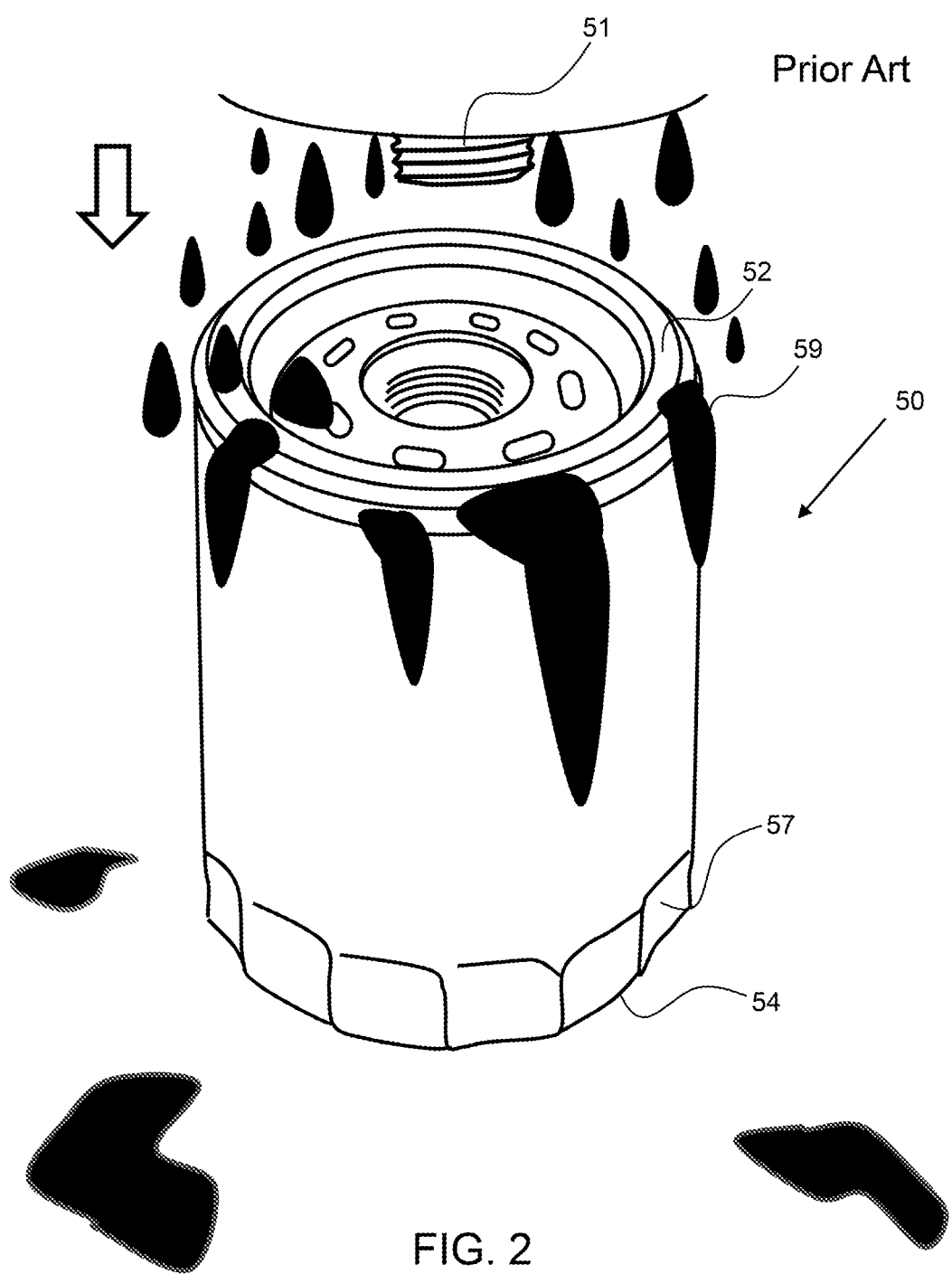
FIG. 2 shows a perspective view of an engine fluid filter removed from the engine and engine fluid, such as oil, dripping from the engine and over top and sides of the fluid filter.

Referring now to FIGS. 1 and 2, as an engine fluid filter 50 is detach from the vehicle 51 and engine fluid 59 drips all over and around the engine fluid filter 50. As shown in FIG. 1, and engine filter may be threaded onto a vehicle. The engine fluid filter has a height 53 from the engine end 52, the end coupled to the engine, and the bottom 54, and a diameter 55. Some engine oil filters have a tightening portion 57, such as a knurled or dimpled portion, usually proximal the bottom, to allow hand attachment of the fluid filter to the vehicle. As shown in FIG. 2, the engine fluid 59 has dripped onto the top, the sides, and onto the floor around the fluid filter.

Figure 3:
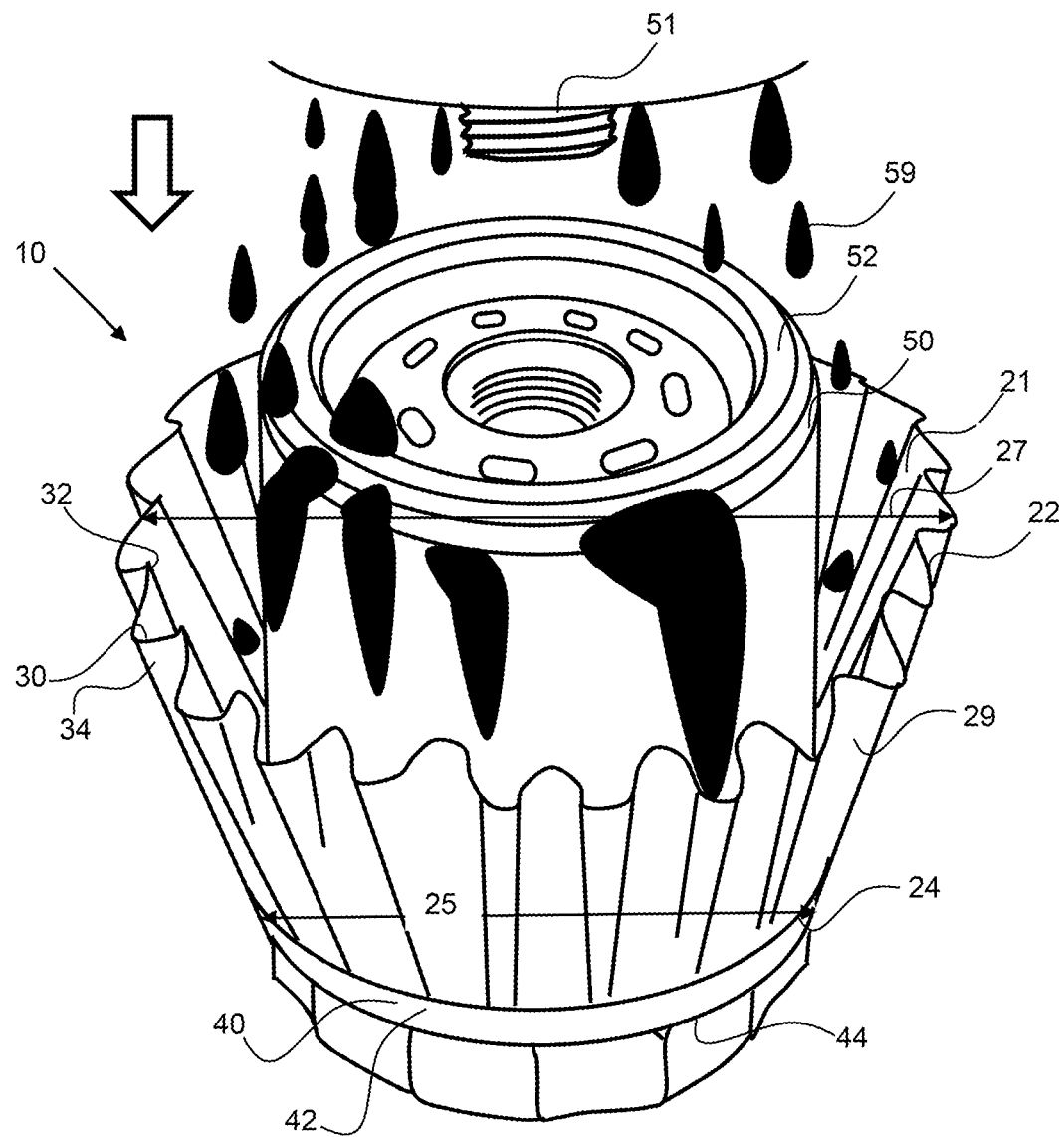
FIG. 3 shows a perspective view of an engine fluid filter removed from the engine and engine fluid, such as oil, dripping from the engine into an exemplary expandable engine fluid catcher.
Figure 4:
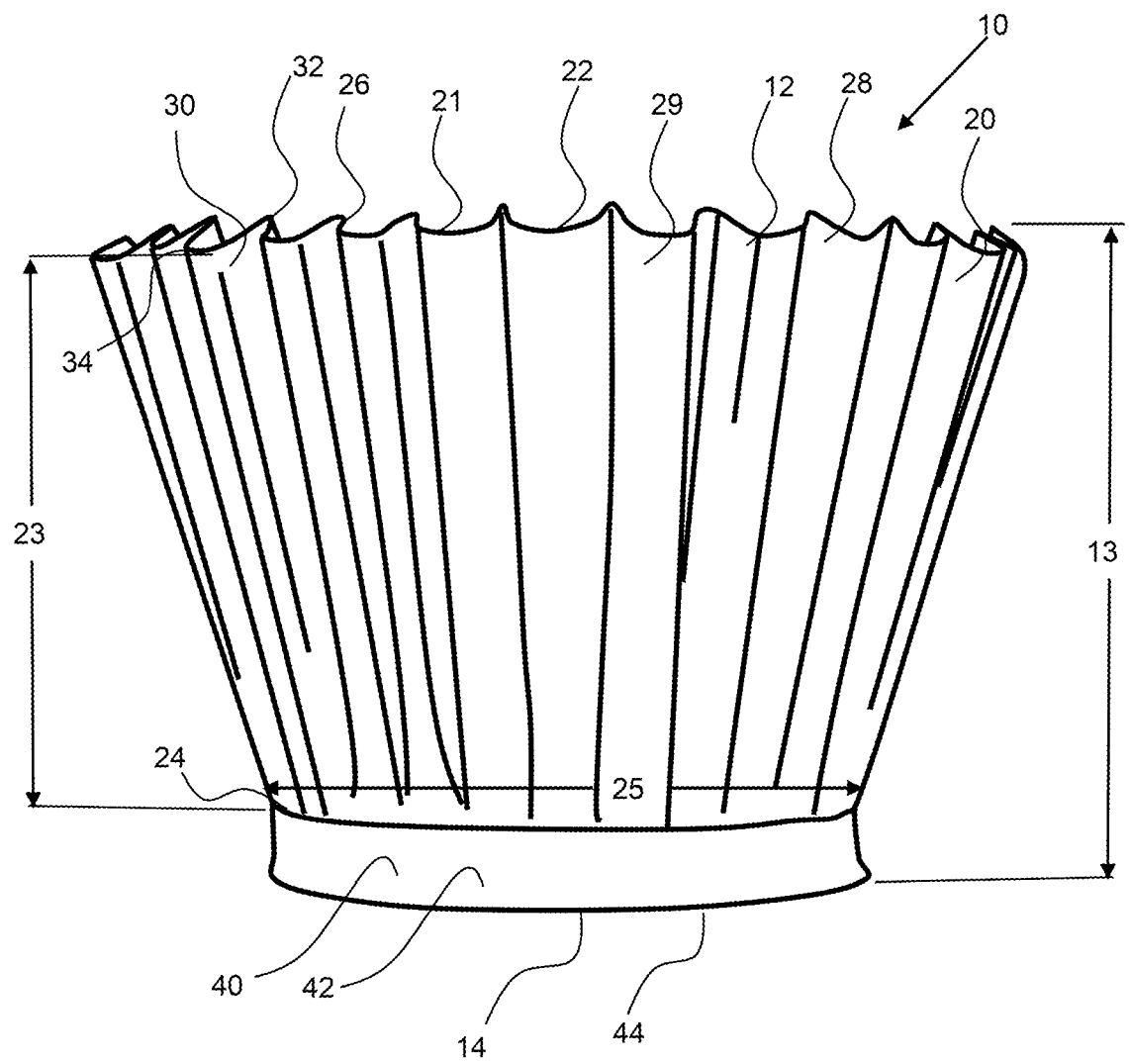
FIG. 4 shows a side view of an exemplary expandable engine fluid catcher.
Figure 5:
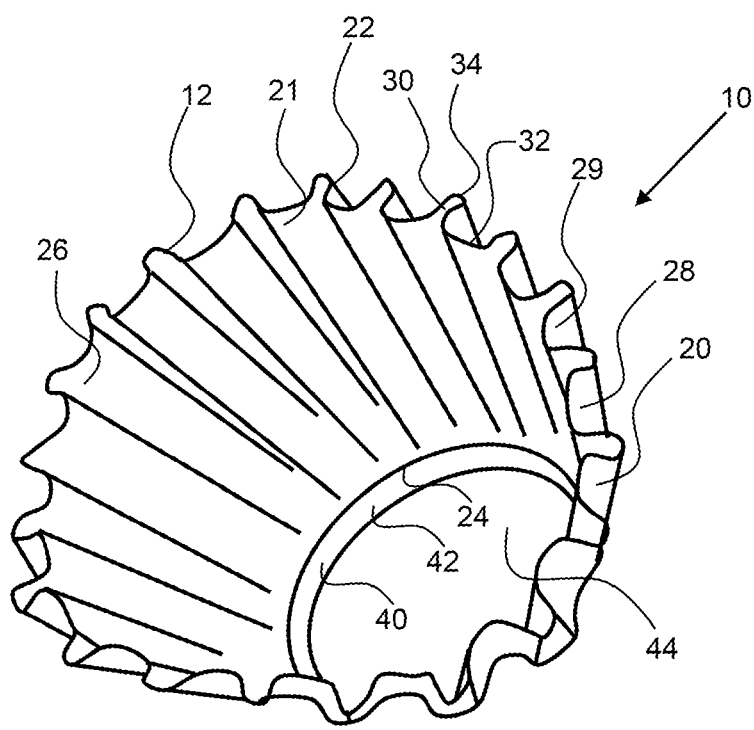
FIG. 5 shows perspective view of an exemplary expandable engine fluid catcher.
Figure 6:
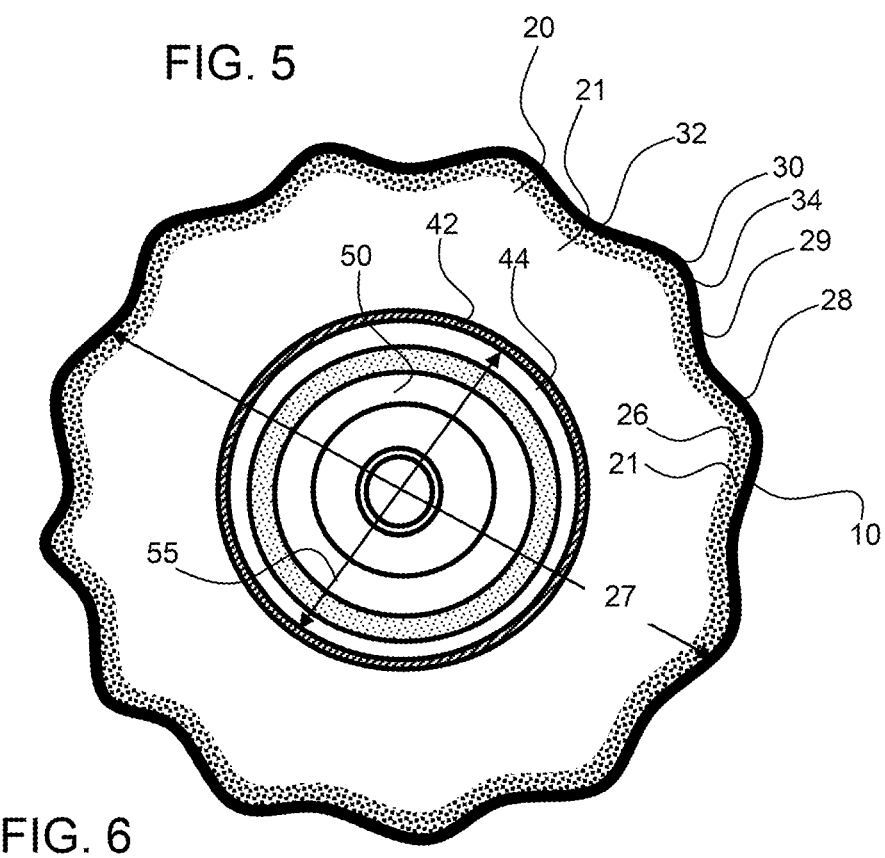
FIG. 6 shows a top view of an exemplary expandable engine fluid catcher retained to an engine fluid filter with the expandable end of the pleated portion expanded to produce a much larger diameter than the diameter of the engine fluid filter.

Referring now to FIGS. 3 to 6, an exemplary expandable engine fluid catcher 10 is configured to be coupled to an engine fluid filter 50 and has an expandable end 22, that can be flared outward radially by expanding the pleats 30 to provide a larger catch diameter 27 of the pleated portion 20. As shown in FIG. 3, the diameter 25 of the pleated portion 20 on the retainer end 24 is much less than the expanded catch diameter 27 that has been enlarged to catch the engine fluid 59, as shown in FIG. 6. The expanded catch diameter may be larger than the retainer portion diameter, larger than the retainer band, or larger than the diameter of the engine fluid filter by a factor of about 1.25 or more, about 1.50 or more, about 1.75 or more, about 2.0 or more and any range between and including the values provided. As shown in FIG. 6, the expanded catch diameter 27 is about 1.75 to 2.0 times greater than the diameter 55 of the engine fluid filter which is the same as the diameter of the retainer band, when the retainer band is retracted around the engine fluid filter. The retainer band may be smaller in diameter when not expanded around the engine fluid filter. The pleats 30 have been expanded wherein the inner pleat folds 32 and outer pleat folds 34 are pulled open, as best shown in FIG. 6.

As shown in FIG. 4, an exemplary expandable engine fluid catcher 10 has a height 23 and diameter of the retainer portion, or of the retainer end 25, that is configured for attachment to a particular type or size of engine fluid filter. The diameter of the retainer end and the retainer portion 40 may be slightly less than the diameter of the engine fluid filter and the retainer portion may be a retainer band 42 that is elastic to allow a tight fit and seal to the outside of the engine fluid filter to retain the engine fluid between the outside of the engine fluid filter and the inside 21 of the expandable engine fluid catcher. An exemplary expandable engine fluid catcher may comprise an absorption layer 26 and a fluid barrier layer 28. An absorption layer 26 may be configured on the inside 21 of the expandable engine fluid catcher such as being an inside layer of the pleated portion 20 and the fluid barrier layer 28 may be configured on the outside 29 of the pleated portion. Exemplary expandable engine fluid catchers may be disposable and may be provided stacked whereby the tapering shape will enable many expandable engine fluid catchers to be packaged in a small volume.

As shown in FIG. 5, and an exemplary expandable engine fluid catcher 10 has a filter aperture 44 configured to enable the retainer portion 40 to fit around the outside diameter of the engine fluid filter. As described herein, the retainer portion may be an elastic band 42 that can be expanded and configured around the outside diameter of the engine fluid filter.

As shown in FIG. 6, an exemplary expandable engine fluid catcher 10 is retained to an engine fluid filter 50 and the expandable end 22 of the pleated portion 20 is expanded to produce a much larger catch diameter 27 than the diameter of the engine fluid filter 55. The expandable portion 22 is almost fully expanded wherein the inner pleat folds 32 and the outer pleat folds 34 are undulations and wavy as opposed to the tighter folds of an unexpanded or less expanded pleated portion. An absorption layer 26 is configured on the inside surface 21 of the pleated portion to soak in the engine fluid and a barrier layer 28 is configured on the outside surface 29 of the pleated portion to prevent leakage of engine fluid through the expandable engine fluid catcher.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. An expandable engine fluid catcher comprising:
   a) a retainer portion comprising an elastic retainer band;
   b) a pleated portion comprising:
      i) an expandable end having a catch diameter;
      ii) a retainer end coupled to the retainer portion having a retainer end diameter;
      iii) a plurality of pleats that extend to the expandable end from the retainer end; and
      iv) an absorption layer configured on an inside surface of the pleated portion; and
      v) a barrier layer configured on an outside surface of the pleated portion to prevent the passage of engine fluid therethrough;
   wherein the plurality of pleats are expandable to increase said catch diameter;
   wherein the catch diameter with the pleated portion in an expanded state is at least 1.5 times the retainer end diameter; and
   c) a filter aperture configured to enable the retainer portion to fit around the outside diameter of an engine fluid filter.

2. The expandable engine fluid catcher of claim 1, wherein the retainer band is urethane.

3. The expandable engine fluid catcher of claim 1, wherein the retainer band is silicone.

4. The expandable engine fluid catcher of claim 1, wherein the absorption layer comprises paper.

5. The expandable engine fluid catcher of claim 1, wherein the barrier layer comprises wax.

6. The expandable engine fluid catcher of claim 1, wherein the pleated portion is a wax coated paper, wherein the paper forms an absorption layer and the wax forms a barrier layer.

7. The expandable engine fluid catcher of claim 1, wherein the catch diameter with the pleated portion in an expanded state is at least 2.0 times the retainer end diameter.

8. A method of catching engine fluid from an engine when removing said engine fluid filter comprising:
   a) providing an expandable engine fluid catcher of claim 1;
   b) providing said engine fluid filter having an engine end and a bottom and an outside diameter;
   c) coupling the retainer band around the engine fluid filter with the pleated portion and pleats extending toward said engine end;
   d) expanding the expandable end of the pleated portion to increase the catch diameter at least 1.25 said outside diameter of the engine fluid filter;
   e) removing the engine oil filter from the engine;
   f) catching engine fluid between the engine fluid filter and an inside surface of the pleated portion.

9. The method of claim 8, wherein the engine is a vehicle engine.

10. The method of claim 8, wherein the engine fluid is oil.

11. The method of claim 10, wherein the engine fluid filter is an oil filter.

12. The method of claim 10, wherein the pleated portion is a wax coated paper, wherein the paper forms the absorption layer and the wax forms the barrier layer; and
   wherein the catch diameter with the pleated portion in an expanded state is at least 2.0 times the retainer end diameter.

* * * * *